United States Patent
Corman et al.

(10) Patent No.: US 9,850,174 B2
(45) Date of Patent: Dec. 26, 2017

(54) CERAMIC MATRIX COMPOSITES HAVING MONOMODAL PORE SIZE DISTRIBUTION AND LOW FIBER VOLUME FRACTION

(71) Applicant: GENERAL ELECTRIC COMPANY, Schenectady, NY (US)

(72) Inventors: Gregory Scot Corman, Ballston Lake, NY (US); Jared Hogg Weaver, Clifton Park, NY (US); Krishan Lal Luthra, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/078,124

(22) Filed: Mar. 23, 2016

(65) Prior Publication Data

US 2017/0275210 A1 Sep. 28, 2017

(51) Int. Cl.
*C04B 35/573* (2006.01)
*C04B 35/76* (2006.01)
(Continued)

(52) U.S. Cl.
CPC .............. *C04B 35/76* (2013.01); *C04B 38/06* (2013.01); *F01D 5/282* (2013.01); *F01D 9/02* (2013.01); *C04B 2235/3826* (2013.01); *C04B 2235/5244* (2013.01); *F05D 2220/30* (2013.01); *F05D 2230/314* (2013.01); *F05D 2300/6033* (2013.01); *F05D 2300/614* (2013.01)

(58) Field of Classification Search
CPC . C04B 35/806; C04B 35/573; C04B 41/5001; C04B 41/52
See application file for complete search history.

(56) References Cited

U.S. PATENT DOCUMENTS 4,324,843 A 4/1982 Brennan et al.
4,626,461 A 12/1986 Prewo et al.
(Continued)

FOREIGN PATENT DOCUMENTS

WO 2014149757 A1 9/2014

OTHER PUBLICATIONS

Weaver, et al; "Laminate Structure Fabricated Using Chemical Vapor Infiltration (CVI)," Pending U.S. Appl. No. 14/633,347, filed Feb. 27, 2015.
(Continued)

*Primary Examiner* — Noah Wiese
(74) *Attorney, Agent, or Firm* — John P. Darling

(57) ABSTRACT

Ceramic matrix composite articles include, for example, a plurality of unidirectional arrays of fiber tows in a matrix having a monomodal pore size distribution, and a fiber volume fraction between about 15 percent and about 35 percent. The articles may be formed by, for example, providing a shaped preform comprising a prepreg tape layup of unidirectional arrays of fiber tows, a matrix precursor, and a pore former, curing the shaped preform to pyrolyze the matrix precursor and burnout the pore former so that the shaped preform comprises the unidirectional arrays of fiber tows and a porous matrix having a monomodal pore size distribution, and subjecting the cured shaped preform to chemical vapor infiltration to densify the porous matrix so that the ceramic matrix composite article has a fiber volume fraction between about 15 percent and about 35 percent.

33 Claims, 8 Drawing Sheets

(51) Int. Cl.
  *C04B 38/06*  (2006.01)
  *F01D 5/28*  (2006.01)
  *F01D 9/02*  (2006.01)

(56) References Cited

U.S. PATENT DOCUMENTS

| | | | |
|---|---|---|---|
| 5,294,489 A * | 3/1994 | Luthra | B32B 18/00 |
| | | | 428/366 |
| 5,605,868 A | 2/1997 | Chyung et al. | |
| 5,759,688 A * | 6/1998 | Lee | C04B 35/806 |
| | | | 428/366 |
| 5,865,922 A * | 2/1999 | Behrendt | C04B 35/806 |
| | | | 156/155 |
| 5,945,166 A * | 8/1999 | Singh | C04B 35/573 |
| | | | 427/255.12 |
| 6,024,898 A * | 2/2000 | Steibel | C04B 35/806 |
| | | | 264/29.1 |
| 7,387,758 B2 | 6/2008 | Merrill et al. | |
| 8,999,439 B2 | 4/2015 | Jehl et al. | |
| 2002/0190409 A1 | 12/2002 | Burdsall, II et al. | |
| 2004/0192534 A1 * | 9/2004 | Nixon | C04B 35/565 |
| | | | 501/95.2 |
| 2011/0071014 A1 | 3/2011 | Kmetz et al. | |
| 2013/0122763 A1 | 5/2013 | Fish et al. | |
| 2013/0167374 A1 * | 7/2013 | Kirby | C04B 35/64 |
| | | | 29/888.02 |
| 2014/0363574 A1 | 12/2014 | Lazur et al. | |

OTHER PUBLICATIONS

Weaver, et al; "Ceramic Matrix Composite Structures with Controlled Microstructures Fabricated Using Chemical Vapor Infiltration (CVI)," Pending U.S. Appl. No. 14/633,422, filed Feb. 27, 2015.

Weaver, et al; "Improved Uniformity of Fiber Spacing in CMC Materials," U.S. Appl. No. 14/813,239, filed Jul. 30, 2015.

Weaver, et al; "Improved Uniformity of Fiber Spacing in CMC Materials," U.S. Appl. No. 14/813,271, filed Jul. 30, 2015.

* cited by examiner

CERAMIC MATRIX COMPOSITES HAVING MONOMODAL PORE SIZE DISTRIBUTION AND LOW FIBER VOLUME FRACTION

TECHNICAL FIELD

The present disclosure generally relates to ceramic matrix composites, and more particularly, to articles and methods for forming ceramic matrix composite articles having monomodal pore size distribution, and optimized fiber volume fraction.

BACKGROUND

Ceramic matrix composites (CMCs) generally include a ceramic fiber reinforcement material embedded in a ceramic matrix material. The reinforcement material serves as the load-bearing constituent of the CMC in the event of a matrix crack, while the ceramic matrix protects the reinforcement material, maintains the orientation of its fibers, and serves to dissipate loads to the reinforcement material. Of particular interest to high-temperature applications, such as in gas turbines, are silicon-based composites, which include silicon carbide (SiC) as the matrix and/or reinforcement material.

Different processing methods have been employed in forming CMCs. For example, one approach includes chemical vapor infiltration (CVI). CVI is a process whereby a matrix material is infiltrated into a fibrous preform by the use of reactive gases at elevated temperature to form the fiber-reinforced composite. For example, conventional cloth based CMCs formed by CVI typically have a porosity between 10 percent and 20 percent, a fiber volume fraction between 35 percent and 40 percent, and an interlaminar tensile (ILT) strength between 1 ksi and 3 ksi, as measured by a standard 1 inch diameter button pull test. CVI composite matrices typically have no free silicon phase, and thus have good creep resistance and the potential to operate at temperatures above 2,570 degrees Fahrenheit.

Another approach includes melt infiltration (MI), which employs molten silicon to infiltrate into a fiber-containing preform. For example, conventional unidirectional tape-based CMCs formed by MI typically have a porosity of below 3 percent, a fiber volume fraction between 20 percent and 33 percent, and an interlaminar tensile (ILT) strength between 5 ksi and 9 ksi. The matrix of MI composites contains a free silicon phase (i.e. elemental silicon or silicon alloy) that limits use of the CMC to below that of the melting point of the silicon or silicon alloy, or about 2,550 degrees Fahrenheit to 2,570 degrees Fahrenheit. Moreover, the free silicon phase causes the MI SiC matrix to have relatively poor creep resistance.

Another approach employs a partial CVI process followed by an MI process, and is generally referred to as "slurry cast MI." This approach usually yields an intermediate porosity between that of MI composites and CVI composites, generally of about 6 percent, a fiber volume fraction between 35 percent and 40 percent, an interlaminar tensile (ILT) strength between 2 ksi and 4 ksi, and also contains residual free silicon phase within the composite matrix.

SUMMARY

Shortcomings of the prior art are overcome and additional advantages are provided through the provision, in one embodiment, of a method for forming a ceramic matrix composite article. The method includes, for example, providing a shaped preform comprising a prepreg tape layup of unidirectional arrays of fiber tows, a matrix precursor, and a pore former, curing the shaped preform to pyrolyze the matrix precursor and burnout the pore former so that the shaped preform comprises the unidirectional arrays of fiber tows and a porous matrix skeleton having a monomodal pore size distribution, and subjecting the cured shaped preform to chemical vapor infiltration to densify the porous matrix skeleton so that the ceramic matrix composite article has a fiber volume fraction between about 15 percent and about 35 percent.

In another embodiment, a method for forming a ceramic matrix composite article includes, for example, providing a shaped preform comprising a prepreg tape layup of unidirectional arrays of fiber tows, a matrix precursor for forming a ceramic matrix, a particulate filler, and a pore former, curing the shaped preform to pyrolyze the matrix precursor and burnout the pore former so that the shaped preform comprises the unidirectional arrays of fiber tows and a porous ceramic matrix skeleton having a monomodal pore size distribution with a median pore size of between about 1 micrometers and about 30 micrometers, and subjecting the cured shaped preform to chemical vapor infiltration with gaseous ceramic, a partial chemical vapor infiltration and melt infiltration, or a partial chemical vapor infiltration, slurry casting, and melt infiltration, to densify the porous ceramic matrix skeleton so that the ceramic matrix composite article has a fiber volume fraction between about 15 percent and about 35 percent.

In another embodiment, a ceramic matrix composite article includes, for example, a plurality of unidirectional arrays of fiber tows in a matrix having a monomodal pore size distribution, and wherein the ceramic matrix composite article comprises a fiber volume fraction between about 15 percent and about 35 percent.

DRAWINGS

The foregoing and other features, aspects and advantages of this disclosure will become apparent from the following detailed description of the various aspects of the disclosure taken in conjunction with the accompanying drawings, wherein.

DETAILED DESCRIPTION

Embodiments of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating embodiments of the present disclosure, are given by way of illustration only, and not by way of limitation. Various substitutions, modifications, additions, and/or arrangements, within the spirit and/or scope of the underlying inventive concepts will be apparent to those skilled in the art from this disclosure.

Figure 1:
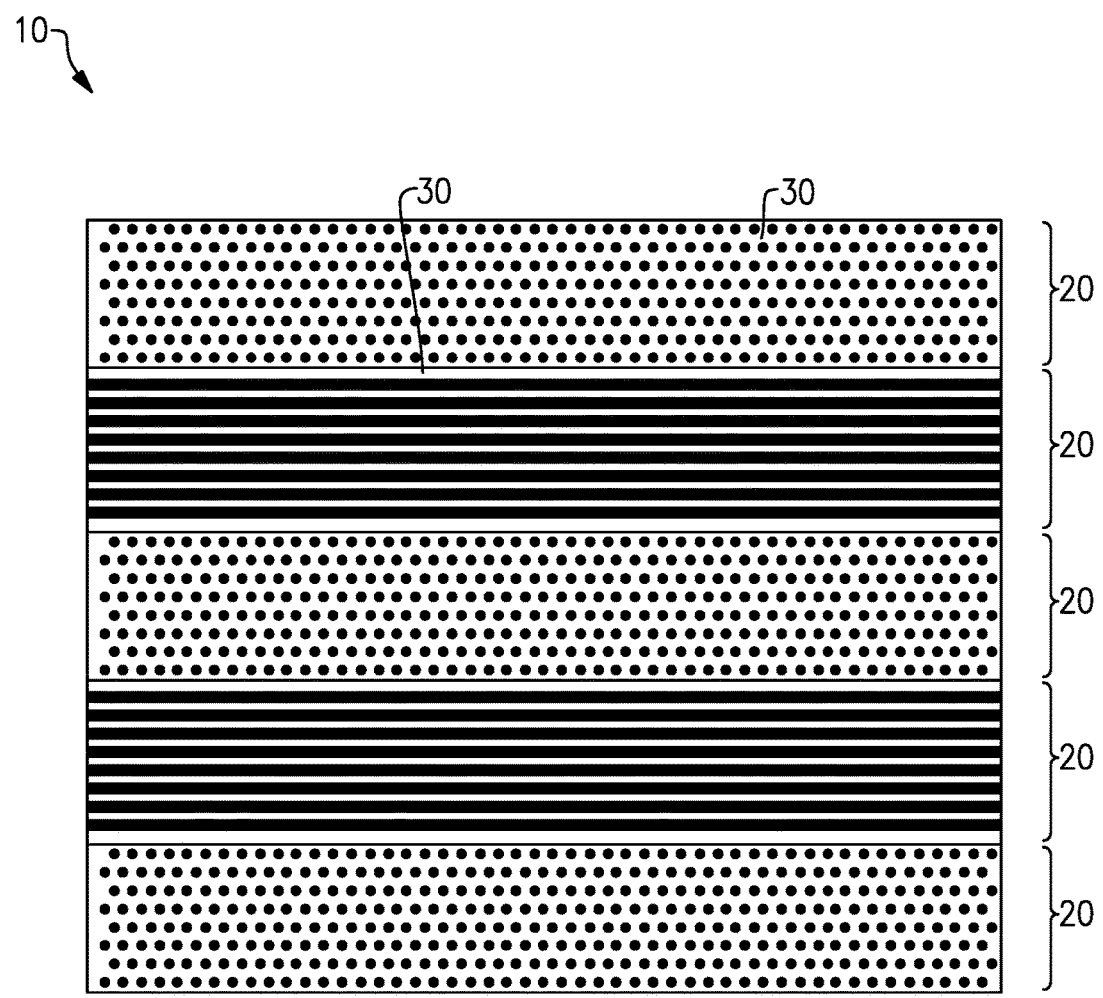
FIG. 1 is a cross-sectional view of a ceramic matrix composite article according to an embodiment of the present disclosure.

FIG. 1 illustrates a portion of a ceramic matrix composite (CMC) article 10 according to an embodiment of the present disclosure. CMC article 10 may include a ceramic fiber reinforcement material in a ceramic matrix material. As described in greater detail below, in some embodiments, CMC article 10 may be formed by a process resulting in CMC article 10 having a plurality of unidirectional arrays of fiber tows 20, and a densified matrix 30. Such a CMC article may be tailored to have improved properties such as, but not limited to, mechanical properties (e.g., interlaminar (ITL) strength and proportional limit (PL)), and oxidation resistance.

As further described below, for example, pre-coated fiber tows, prepregging, ply layup, consolidation, and burnout may result in a cured preform for subsequent densification. A slurry may be used during prepregging, having for example a matrix precursor along with particulate fillers and pore formers such as polymeric pore formers to adjust the fiber spacing and pore size distribution and give a freestanding preform for CVI densification. After curing of the preform, e.g., pyrolysis of the matrix precursor and burnout of the pore formers, the cured preform can be densified using CVI alone, using a combination of a partial CVI followed by melt infiltration with silicon, silicon alloy or an oxide, such as rare-earth disilicates ($RE_2Si_2O_7$), or using slurry infiltration prior to melt infiltration. Advantages of using tow-based unidirectional ply preforms may give more uniform pore structure for densification resulting in a more uniform CMC microstructure. Touching of fibers and continuous coatings may be eliminated, thereby improving mechanical properties and oxidation resistance of a CMC article. Such a technique of the present disclosure may be advantageous for application to silicon-bearing ceramic turbine components, for example, turbine blades, vanes, nozzles, shrouds, combustors, etc., and repairs thereof.

Figure 2:
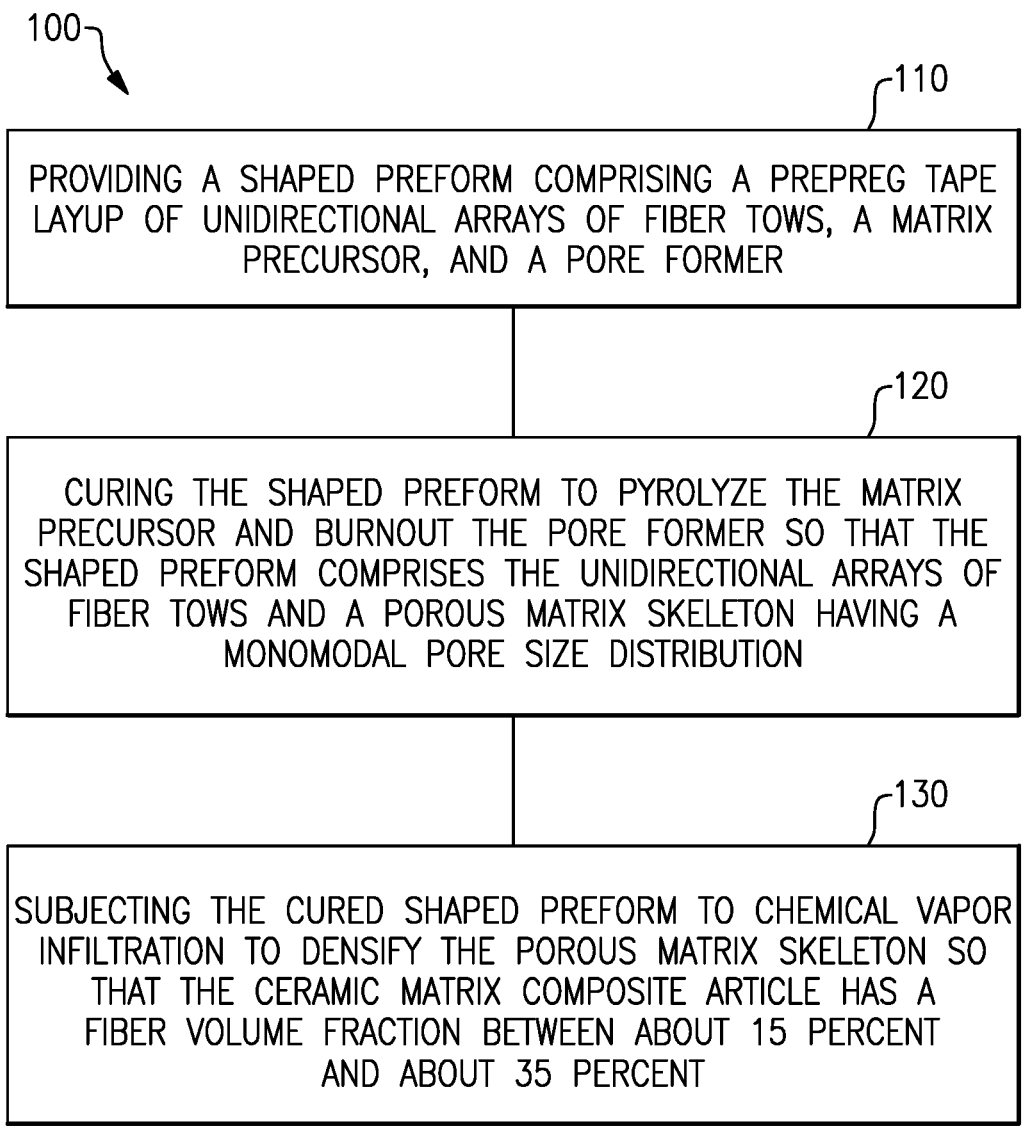
FIG. 2 is a flowchart of a method according to an embodiment of the present disclosure for forming the ceramic matrix composite article of FIG. 1.

FIG. 2 illustrates a method 100 for forming ceramic matrix composite article 10 (FIG. 1) in accordance with an embodiment of the present disclosure. In this exemplary embodiment, method 100 generally includes, at 110, providing a shaped preform comprising a prepreg tape layup of unidirectional arrays of fiber tows, a matrix precursor, and a pore former, at 120 curing the shaped preform to pyrolyze the matrix precursor and burnout the pore former so that the shaped preform comprises the unidirectional arrays of fiber tows and a porous matrix skeleton having a monomodal pore size distribution, and at 130 subjecting the cured shaped preform to chemical vapor infiltration to densify the porous matrix skeleton so that the ceramic matrix composite article has a fiber volume fraction between about 15 percent and about 35 percent.

Figure 3:
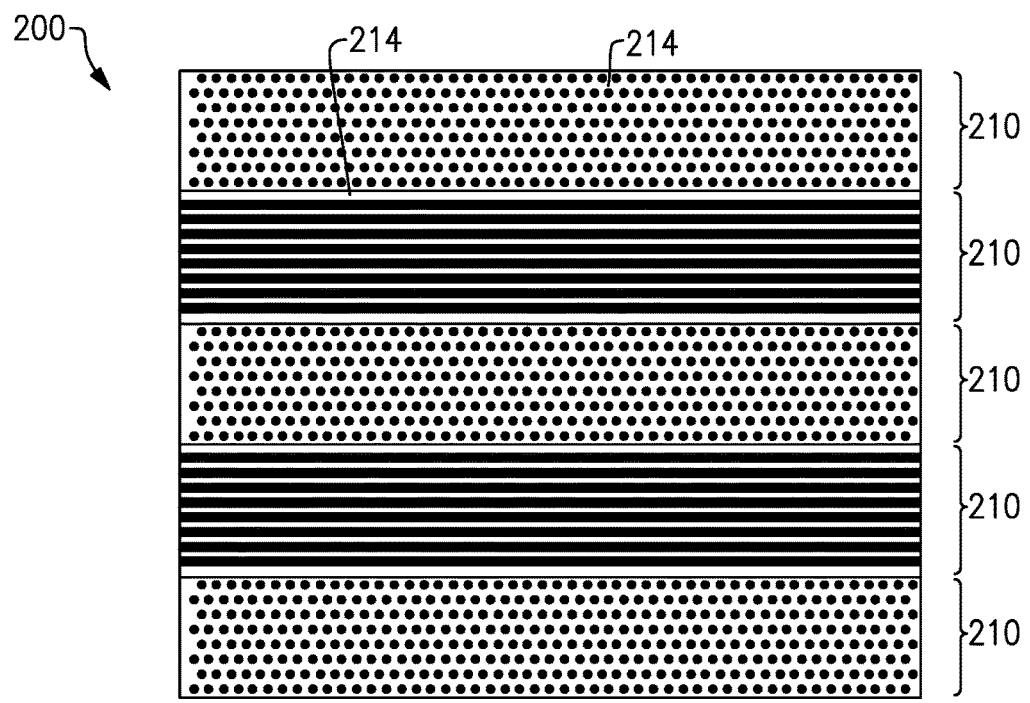
FIG. 3 is a cross-sectional view of an uncured preform having a plurality of unidirectional prepreg tapes for use in the forming of the ceramic matrix composite article of FIG. 1.

FIG. 3 illustrates an uncured shaped preform 200 fabricated from a plurality of prepreg layers 210 in the form of tape-like structures unidirectionally-aligned tows impregnated with a slurry 214 to create a generally two-dimensional laminate. The prepreg may be formed form, for example, a reinforcement material of a desired CMC and a slurry, which slurry may include a matrix precursor, a pore formers, particulate fillers, and a carrier, as described below. The slurry can be roll milled to deagglomerate and disperse the powders. The slurry can be infiltrated into the coated tows by passing the tows through a bath of the slurry. The tow can then be wound onto a drum and may include partial drying of the slurry such that a tape is formed. The tape can be removed from the drum and unidirectional preform plies can be cut to form the tape.

Materials for the tows may include silicon carbide (SiC) fibers, polycrystalline SiC fibers, or other suitable fiber. An example of a material suitable for the tows is HI-NICALON® from NGS Advanced Fibers Co. LTD. A suitable range for the diameters of the fibers is about five to about twenty micrometers, though fibers with larger and smaller diameters are also within the scope of this disclosure. The fibers may be preferably coated with materials such as a carbon or boron nitride interface layer (not shown) to impart certain desired properties to the CMC article, e.g., allows slippage between coating and the formed matrix material of the CMC article. A fiber tow, for example, may be a single bundle of about 500 individual fibers.

The slurry may include a matrix precursor such as organic or inorganic material that leaves char/residue after burnout such as pyrolysis or firing. In some embodiments, the matrix precursor may include a silicon containing precursor operable, as described below, for forming a porous silicon containing precursor such as silicon carbide in the cured preform. Examples of a matrix precursor include tetraethyl orthosilicate (TEOS), polycarbosilanes, polysilazanes, polysiloxanes, phenolics, and furanic compounds. A pore former may include a particle or other species that can remain present through a consolidation process but can be fugitive in the burnout or pyrolysis process resulting in a pore. Examples of a pore former can comprise polyethylene, polypropylene, polyamide, nylon, polytetrafluoroethylene (PTFE), polystyrene, polyvinyl acetate, polyvinyl alcohol, and/or cellulosic powders. Fillers may include an oxide or non-oxide particle or whisker that helps control shrinkage. Examples of a filler include SiC, $B_4C$, $SiO_2$, HfC, $HfB_2$, ZrC, $ZrB_2$, $MoSi_2$, $Si_3N_4$, $Al_2O_3$, rare earth silicates, and rare earth silicides. A carrier may include organic or inorganic liquid that dissolves or carries the matrix precursor and other ingredients. Examples of a carrier include water, isopropanol, toluene, and acetone.

The particles included in the pore former may include a monomodal particle size distribution for a collection of particles which have a single clearly discernable maxima on a particle size distribution curve as compared to a collection of particles having a bimodal particle size distribution having two clearly discernable maxima on a particle size distribution curve, or a for a collection of particles having a multimodal particle size distribution of three or more clearly discernable maxima on a particle size distribution curve. The particles included in a pore former may include a median size in the range of from about 1 micrometer to about 30 micrometers, may include a median size in the range of from about 1 micrometer to about 20 micrometers, may include a median size in the range of from about 3 micrometer to about 10 micrometers, and/or may include a median size in the range of from about 3.5 micrometers to about 8 micrometers. Prior to passing the tows through a bath of the slurry, the slurry including the matrix precursor, the pore formers, the particulate fillers, and the carrier may be combined and mixed until a uniform mixture is obtained with the pore formers having a uniform spacial distribution.

The plurality of plies of the resulting prepregs are laid-up or stacked into a desired pattern and shape, and typically arranged so that tows of the prepreg layers are oriented parallel, transverse (e.g., perpendicular), or at an angle relative to other tows of the prepreg layers in other plies. The plurality of layers may typically undergo consolidation or debulking while subjected to applied pressure and an elevated temperature, such as in a vacuum or in and autoclave or localized application of pressure and heat.

Figure 4:
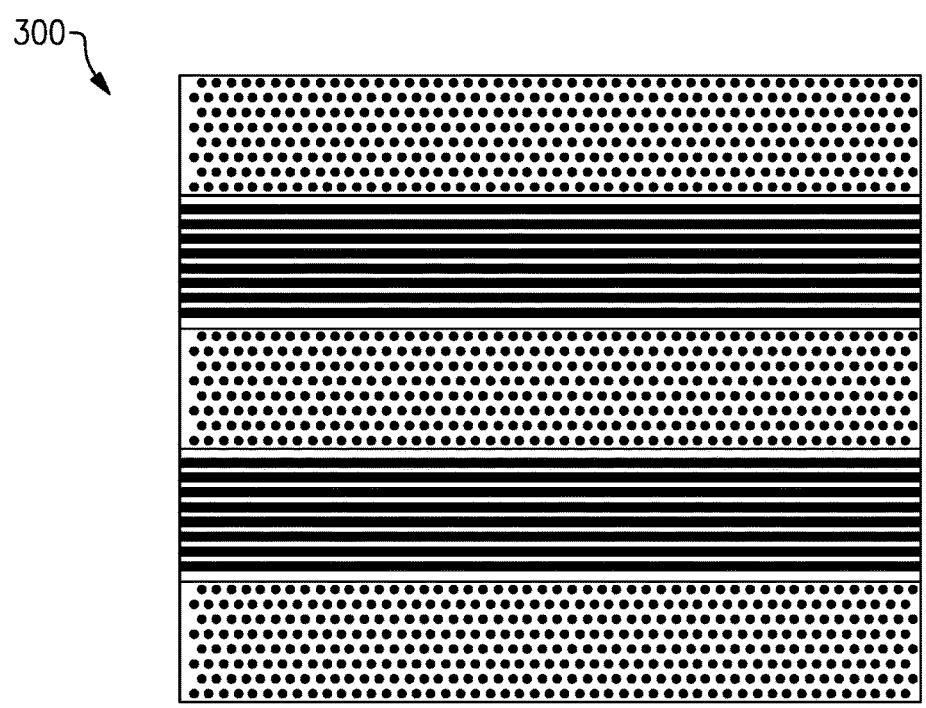
FIG. 4 is a cross-sectional view of a cured preform formed from the uncured preform of FIG. 3.

The consolidated plurality of stacked plies is subjected to burnout such as pyrolysis or heated in vacuum or in an inert or a reactive atmosphere in order to decompose the matrix precursor, to form a ceramic or ceramic char, and where the pore former is, for example, volatilized, and produces a porous preform for chemical vapor infiltration, resulting in cured preform 300 illustrated in FIG. 4. The resulting porosity of precursor matrix may have a predominantly monomodal pore size distribution and predominantly uniform spacial distribution. For example, the local maxima in the pore size distribution of the cured porous silicon-containing precursor may be between about 1 micrometer to about 30 micrometers, about 1 micrometers to about 20 micrometers, about 3 micrometer to about 10 micrometers, and/or about 3.5 micrometers to about 8 micrometers. The cured preform may have a volume porosity of about 35 percent to about 65 percent.

The cured preform is then subject to chemical vapor infiltration, such as with a gaseous source of silicon carbide supplied externally. The gaseous silicon carbide source infiltrates into the porosity, reacts to deposit SiC on the internal pore surfaces of the porous layer to form a densified silicon carbide matrix of CMC article 10 as shown in FIG. 1, and may contain no free Si metal. An appropriate chemical vapor infiltration gas may include methyl-trichlorosilane, dimethyl-dichlorosilane, silane+methane, tetrachlorosilane+methane, and other suitable gases.

The resulting porosity of CMC article 10 may have a monomodal pore size distribution. For example, the median pore size of the CVI-densified CMC article may be about 1 micrometers to about 20 micrometers, or about 1 micrometers to about 15 micrometers. CMC article 10 may have a volume porosity of about 5 percent to about 20 percent. The CMC article may have a uniform spacial distributed fiber volume percentage. For example, the CMC article may have a fiber volume of between about 15 percent and about 35 percent. In other embodiments, a CMC article may be tailored to have different fiber volume throughout the CMC based on the layup and tape prepregs. For example, CMC article may include at least one first portion having a first fiber volume percentage and at least one second portion having a second fiber volume percentage different from said first fiber volume percentage.

Those skilled in the art will appreciate that the teachings of this disclosure are also applicable to other CMC material combinations, and that such combinations are within the scope of this disclosure. Suitable materials for use in the chemical vapor infiltration process may include silicon carbide, silicon nitride, silicon oxy-nitride, silicon oxy-carbide, silicon dioxide, aluminum nitride, aluminum oxide, boron carbide, zirconium carbide, hafnium carbide, zirconium diboride, hafnium diboride, molybdenum silicides, and other suitable material.

Testing of CMC articles formed in accordance with the technique of the present disclosure, including predominantly monomodal pore size distribution, showed interlaminar tensile (ILT) strength values of about 6 ksi to about 12 ksi for CMCs with 0/90 architecture and a fiber volume fraction of about 18 percent ([0:90]2 s architecture, 0.1" thick) to 28 percent ([0:90]2 s architecture, 0.065" thick), which are significantly higher than the ILT values for conventional CVI composites made from woven fibers, and are comparable to, or better than, typical values for MI-type ceramic composites.

Figure 5:
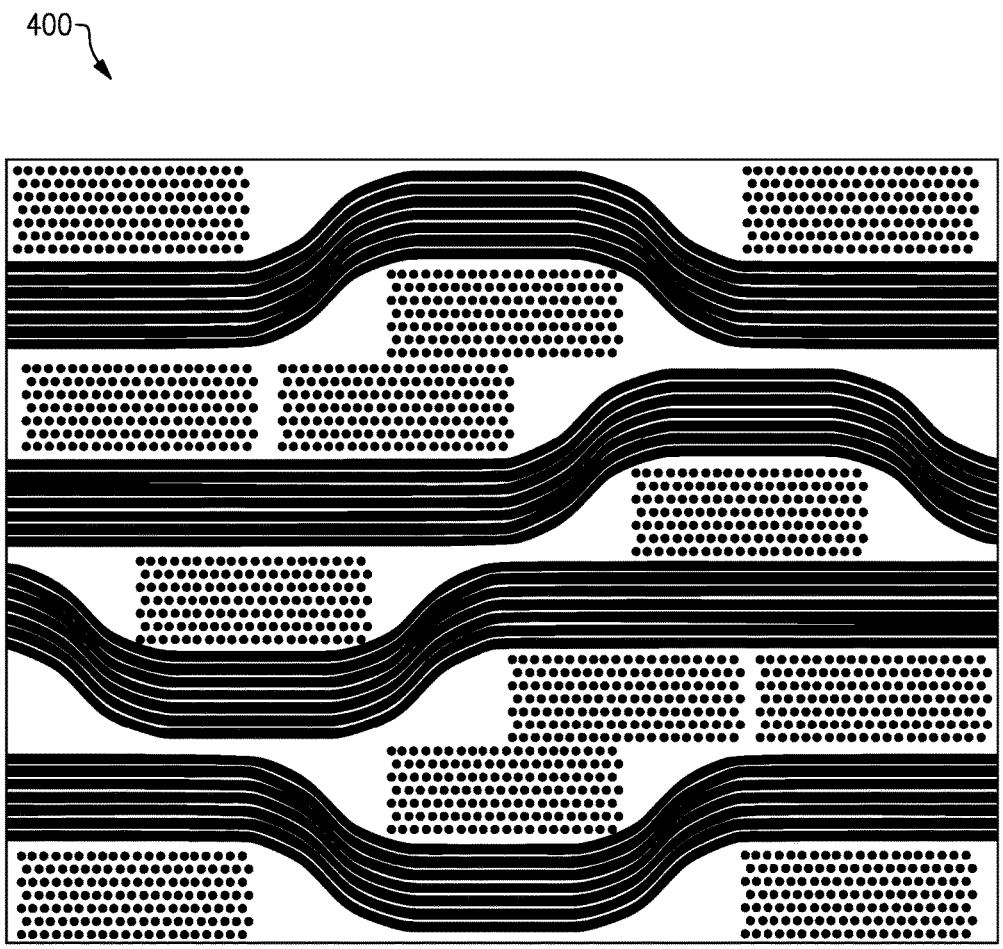
FIG. 5 shows a schematic representation of a conventional CVI preform made from a woven fiber tow.

FIG. 5 shows a schematic representation of the microstructure of a conventional CVI composite preform made with woven fibers. The cross-over of the fiber tows in the weave pattern tend to compress the tows into tight bundles. Also, due to the surface roughness of the woven fiber cloth, the fiber plies tend to pack inefficiently. The microstructure of the conventional CVI preform thus has two distinct types of porosity; the first being the small inter-fiber pores within the fiber tows, and the second being the larger inter-tow pores caused by the weaving pattern and the dis-registry of this pattern at the ply boundaries.

Figure 6:
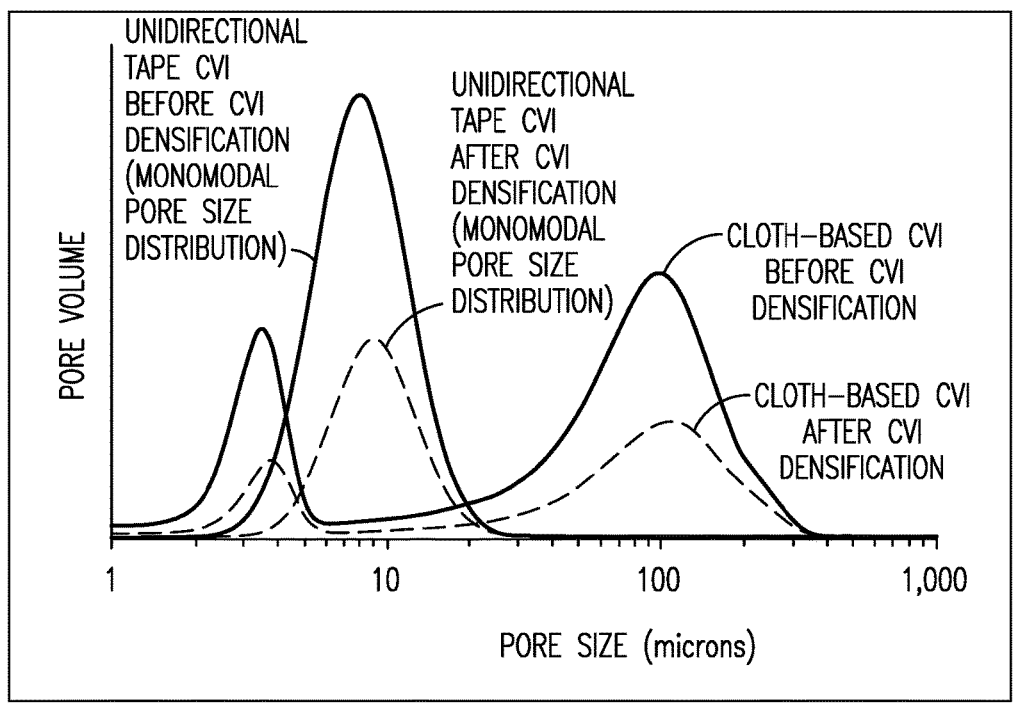
FIG. 6 is an idealized representation of the pore size distribution of a preform and final CVI-densified composite article formed according to the present disclosure compared to a preform and CVI-densified composite formed using a woven fiber layup as is typically used for conventional CVI.

FIG. 6 shows an idealized representation of the pore size distributions for CVI preforms and final densified composites made using the conventional woven fiber-based CVI approach and by the technique of the present disclosure. The two populations of pores illustrated in FIG. 5 and described in the previous paragraph lead to a bimodal or multimodal pores size distribution for the conventional woven fiber CVI preforms. By using the process outlined in the current invention, and described in FIGS. 7-9, a preform microstructure as shown in FIG. 1 is obtained, which has a monomodal pore size distribution. Following densification via CVI or a combination of CVI and MI processes, the amount of porosity is reduced and the means of the peaks in the pore size distributions may be shifted, but the multimodal or monomodal nature of the distributions is retained. It is the larger pores, e.g. above 30 micrometers in size, that are primarily responsible for limiting the interlaminar tensile strength and proportional limit strength of conventional cloth-based CVI composites. Composites made by the present disclosure eliminate, or minimize, the amount of this undesirable large porosity, resulting in the improved interlaminar tensile strengths cited.

The present inventors' work indicates that, for a specimen of constant thickness, the interlaminar tensile (ILT) strength is inversely related to the fiber volume fraction, as long as the fibers remain homogenously dispersed within the matrix and as long as the porosity remains predominantly monomodal. On the other hand, the ultimate tensile strength (UTS) and the proportional limit (PL) are directly related to the fiber volume fraction.

Therefore, an optimum balance of properties for a specific application may include CMC articles in accordance with the present disclosure having fiber volumes of about 15 percent to about 35 percent compared to fiber volumes of 35 percent to 40 percent normally used for conventional CVI composites. In some embodiments as noted above, portions of a ceramic matrix composite article may have different of fiber volume percentages based on the desired properties of the different portions of the ceramic matrix composite article. For example, some ceramic matrix composite articles may have portions or regions that have a lower fiber volume percentage compared to other portions or regions that have a higher fiber volume percentage.

Figure 7:
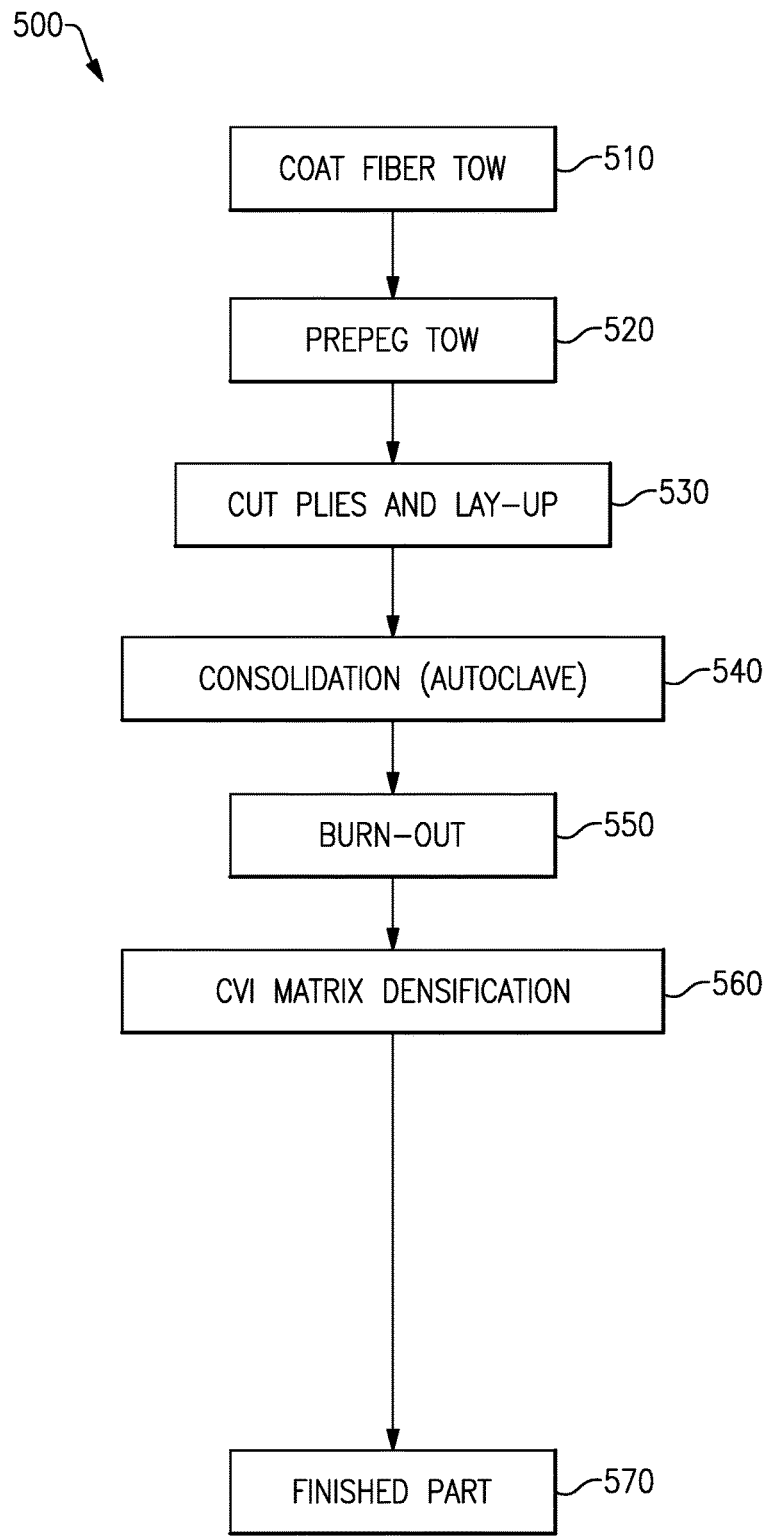
FIG. 7 is flowchart of a method according to one embodiment of the present disclosure for forming a ceramic matrix composite article.

FIG. 7 illustrates a method 500 for forming ceramic matrix composite articles in accordance with an embodiment of the present disclosure. In this exemplary embodiment, method 500 generally includes, at 510 coating fiber tows, at 520 prepregging the tows to form prepreg tape, and at 530 cutting the prepreg tape and laying up an uncured preform for forming the article. At 540, the preform is consolidated such as in an autoclave under heat and pressure. At 550, the preform is subject to a burn-out process so that, for example, the resulting preform has a monomodal pore size distribution. At 560, the cured perform is subjected to chemical vapor infiltration to densify the cured preform to form a finished ceramic matrix composite articles at 570. A ceramic matrix composite articles formed by method 500 may have an optimized range of interlaminar (ILT) strength and proportional limit (PL) with a fiber volume of between about 15 percent and 35 percent, and a volume porosity of about 8 percent to about 20 percent. The ceramic matrix of the ceramic matrix composite may have a monomodal pore size distribution with a median pore size of about 3 micrometer to about 30 micrometers. The ceramic matrix of the ceramic matrix composite may have a uniform spacial pore distribution. Such a ceramic matrix composite article may be advantageous for application to silicon-bearing ceramic turbine components, for example, turbine blades, vanes, nozzles, shrouds, combustors, etc., and repairs thereof.

In the chemical vapor infiltration (CVI) process, a matrix material such as silicon carbide is infiltrated into a fibrous preform by the use of reactive gases at elevated temperature. Generally, limitations introduced by having reactants diffuse into the preform and by-product gases diffusing out of the perform result in relatively high residual porosity of between about 12 percent and about 15 percent in the composite. In the forming of the CMCs using CVI, the inner portion of the composite formed by CVI typically has a higher porosity than the porosity of the outer portion. The CVI composite matrices typically have no free silicon phase, good creep resistance and the potential to operate at temperatures above 2,570 degrees Fahrenheit.

Figure 8:
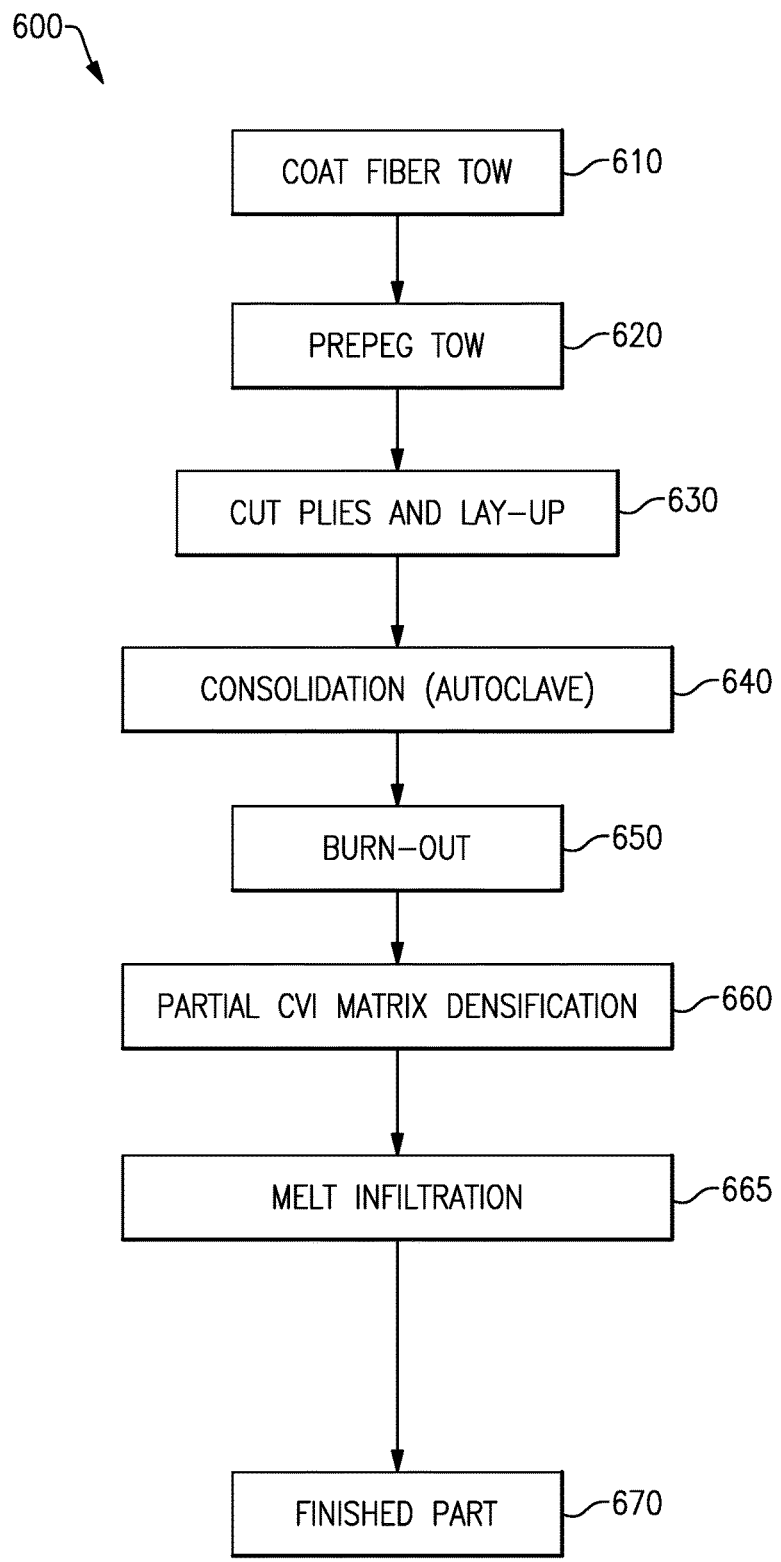
FIG. 8 is flowchart of a method according to one embodiment of the present disclosure for forming a ceramic matrix composite article.

FIG. 8 illustrates a method 600 for forming ceramic matrix composite articles in accordance with an embodiment of the present disclosure. In this exemplary embodiment, method 600 generally includes, at 610 coating fiber tows, at 620 prepregging the tows to form prepreg tape, and at 630 cutting the prepreg tape and laying up an uncured preform for forming the article. At 640, the preform is consolidated such as in an autoclave under heat and pressure. At 650, the preform is subject to a burn-out process so that, for example, the preform matrix has a monomodal pore size distribution. At 660, the cured perform is subjected to a chemical vapor infiltration to densify the cured preform resulting in a volume porosity of about 12 percent to about 35 percent. Further densification may occur at 665 with melt infiltration process to form a finished ceramic matrix composite articles at 570. The melt infiltration may include silicon, silicon alloy, a silicide, an oxide, or a combination thereof. In method 600, the step of chemical vapor infiltration may be a partial or full chemical vapor infiltration compared to the chemical vapor infiltration process of method 500 (FIG. 6). A ceramic matrix composite articles formed by method 600 may have a volume porosity of less than about 5 percent. The ceramic matrix of the ceramic matrix composite may have a monomodal pore size distribution with a median pore size of about 1 micrometers to about 20 micrometers. The ceramic matrix of the ceramic matrix composite may have a uniform spacial pore distribution. Such a ceramic matrix composite article may be advantageous for application to silicon-bearing ceramic turbine components, for example, turbine blades, vanes, nozzles, shrouds, combustors, etc., and repairs thereof.

Figure 9:
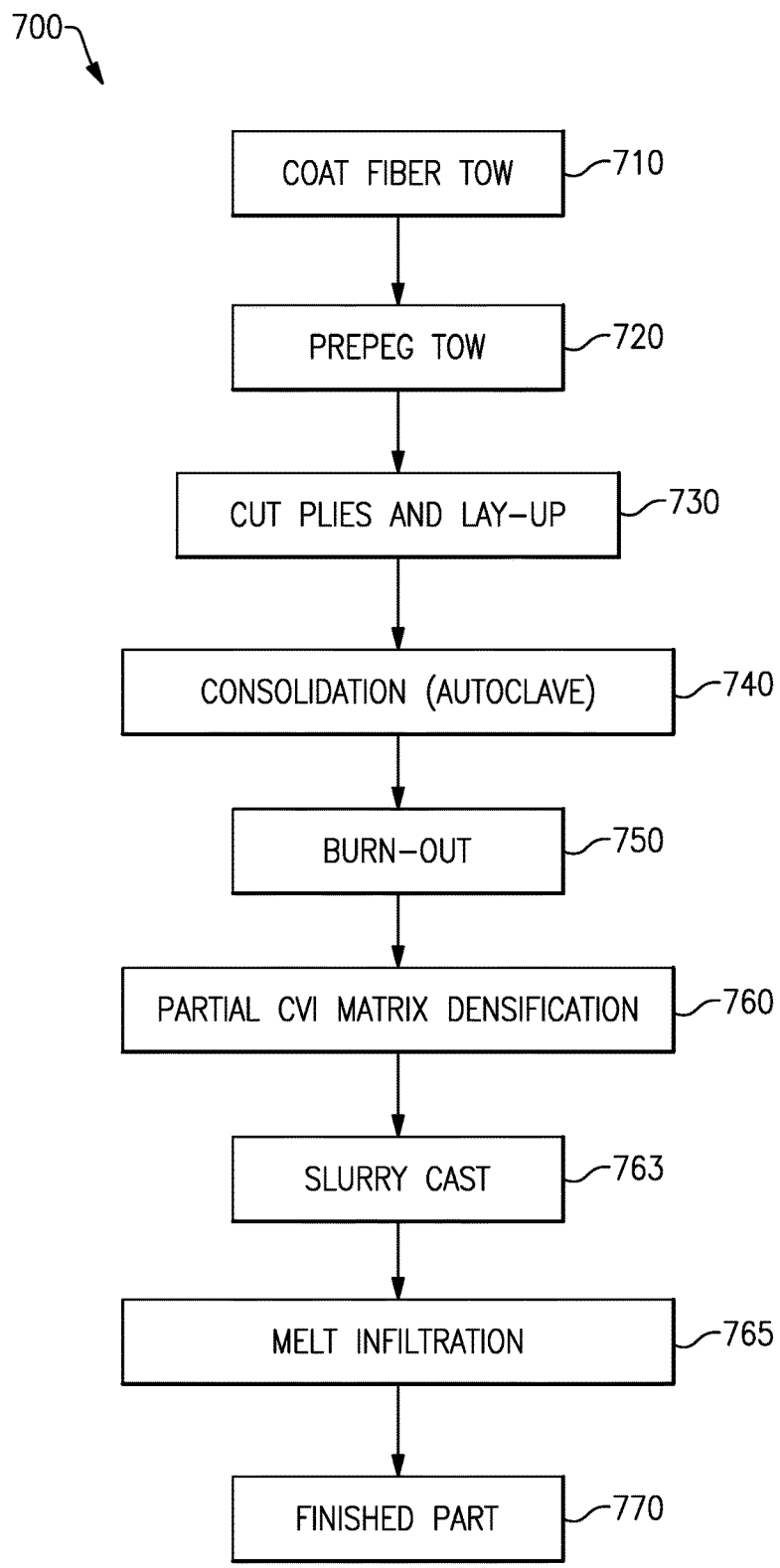
FIG. 9 is flowchart of a method according to one embodiment of the present disclosure for forming a ceramic matrix composite article.

FIG. 9 illustrates a method 700 for forming ceramic matrix composite articles in accordance with an embodiment of the present disclosure. In this exemplary embodiment, method 700 generally includes, at 710 coating fiber tows, at 720 prepregging the tows to form prepreg tape, and at 730 cutting the prepreg tape and laying up an uncured preform for forming the article. At 740, the preform is consolidated such as in an autoclave under heat and pressure. At 750, the preform is subject to a burn-out process so that, for example, the preform matrix has a monomodal pore size distribution. At 760, the cured perform is subjected to chemical vapor infiltration to densify the cured preform. Further, densification may be occur at 763 by application of a slurry cast followed at 767 by melt infiltration to form a finished ceramic matrix composite articles at 770. The slurry cast may include silicon carbide, silicon nitride, molybdenum silicides, boron carbide, HfC, ZrC, HfB2, ZrB2, rare earth silicates, and the melt infiltration may include silicon, silicon alloys, silicides, oxide, or combinations thereof. A ceramic matrix composite articles formed by method 700 may have a volume porosity of less than about 5 percent. The ceramic matrix of the ceramic matrix composite may have a monomodal pore size distribution with a median pore size of about 1 micrometers to about 20 micrometers. The ceramic matrix of the ceramic matrix composite may have a uniform spacial pore distribution. Such a ceramic matrix composite article may be advantageous for application to silicon-bearing ceramic turbine components, for example, turbine blades, vanes, nozzles, shrouds, combustors, etc., and repairs thereof.

The further densification in methods 600 and 700 using melt infiltration may result in ceramic matrix composite articles that are fully dense, e.g., having generally zero, or less than about 5 or less that about 3 percent by volume residual porosity. This very low porosity gives the composite desirable mechanical properties, such as a high proportional limit strength and interlaminar tensile and shear strengths, high thermal conductivity and good oxidation resistance. The matrices may have a free silicon phase (i.e. elemental silicon or silicon alloy) that may limits the use temperature of the ceramic matrix composite articles to below that of the melting point of the silicon or silicon alloy, or about 2,550 degrees Fahrenheit to 2,570 degrees Fahrenheit. The free silicon phase may result in a lower creep resistance compared to densification solely by chemical vapor infiltration.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for forming a ceramic matrix composite article, the method comprising:
   curing a shaped preform comprising a prepreg tape layup of unidirectional arrays of fiber tows, a matrix precursor, and a pore former to pyrolyze the matrix precursor and burnout the pore former so that the shaped preform comprises the unidirectional arrays of fiber tows and a porous matrix skeleton having a monomodal pore size distribution, wherein a median of the monomodal pore size distribution of the cured preform is between about 1 micrometers and about 30 micrometers; and
   subjecting the cured shaped preform to chemical vapor infiltration to densify the porous matrix skeleton so that the ceramic matrix composite article has a fiber volume fraction between about 15 percent and about 35 percent.

2. The method of claim 1 wherein the porous matrix skeleton comprises a uniform spacial porosity distribution.

3. The method of claim 1 wherein the porous matrix skeleton comprises a ceramic.

4. The method of claim 3 wherein the ceramic comprises silicon carbide.

5. The method of claim 3 wherein the ceramic is derived from the pyrolysis of the matrix precursor.

6. The method of claim 1 wherein the matrix precursor is polycarbosilanes, tetraethyl orthosilicates, polysiloxanes, phenolics, furanic compounds and/or polysilazanes.

7. The method of claim 1 wherein the subjecting comprises subjecting the cured shaped preform to a gaseous mixture that deposits silicon carbide.

8. The method of claim 4 wherein the subjecting the cured shaped preform to chemical vapor infiltration comprises subjecting the cured shaped preform to a gaseous mixture that deposits silicon carbide.

9. The method of claim 1 wherein the ceramic matrix composite article comprises an interlaminar tensile strength of over about 6 ksi.

10. The method of claim 1 wherein a median of the monomodal pore size distribution of the cured preform is between about 1 micrometers and about 20 micrometers.

11. The method of claim 1 wherein the chemical vapor infiltration comprises a partial chemical vapor infiltration, and further comprising subjecting the partial chemical vapor infiltration densified ceramic matrix composite article to a melt infiltration.

12. The method of claim 11 wherein the melt infiltration comprises silicon, a silicon alloy, or oxide.

13. The method of claim 11 wherein after the ceramic matrix composite article is subjected to the melt infiltration it comprises a porosity less than about 5 percent.

14. The method of claim 1 wherein the chemical vapor infiltration comprises a partial chemical vapor infiltration, and further comprising subjecting the partial chemical vapor infiltration densified ceramic matrix composite article to a slurry casting and a melt infiltration.

15. The method of claim 14 wherein the slurry casting comprises a slurry comprising silicon carbide, boron carbide, one or more oxides, and/or combinations thereof.

16. The method of claim 1 wherein the cured shaped preform comprises a volume porosity of about 35 percent to about 65 percent.

17. The method of claim 1 wherein the ceramic matrix composite article comprises a volume porosity of about 5 percent to about 20 percent.

18. The method of claim 1 wherein the ceramic matrix composite article comprises at least one first portion having a first fiber volume percentage and at least one second portion having a second fiber volume percentage different from said first fiber volume percentage.

19. The method of claim 1 wherein the pore former comprises polyethylene, polypropylene, polyamide, nylon, polytetrafluoroethylene, polystyrene, polyvinyl acetate, polyvinyl alcohol, or cellulosic powders.

20. The method of claim 1 wherein the shaped prepreg further comprises silicon carbide particles, boron carbide particles, oxide particles, and/or combinations thereof.

21. The method of claim 1 wherein the fiber tows comprise silicon carbide fiber tows.

22. The method of claim 1, wherein each fiber tow comprises about 500 individual fibers.

23. The method of claim 22, wherein the fibers have a diameter range of about 5 to 20 micrometers.

24. The method of claim 1, wherein the shaped prepreg further comprises particles or whiskers of SiC, $B_4C$, $SiO_2$, HfC, $HfB_2$, ZrC, $ZrB_2$, $MoSi_2$, $Si_3N_4$, $Al_2O_3$, rare earth silicates, or rare earth silicides.

25. The method of claim 1, wherein the shaped prepreg further comprises a carrier comprising water, isopropanol, toluene, or acetone.

26. The method of claim 8, wherein the gaseous mixture comprises methyl-trichlorosilane, dimethyl-dichlorosilane, silane+methane, and/or tetracholosilane+methane.

27. The method of claim 14, wherein the slurry cast comprises silicon carbide, silicon nitride, molybdenum silicides, boron carbide, HfC, ZrC, HfB2, ZrB2, or rare earth silicates.

28. The method of claim 27, wherein the melt infiltration comprises silicon, a silicon alloy, a silicide, an oxide, or a combination thereof.

29. The method of claim 19, wherein the pore former comprises particles having a median size in a range of about 1 micrometer to about 30 micrometers.

30. The method of claim 19, wherein the pore former comprises particles having a median size in a range of about 1 micrometer to about 20 micrometers.

31. The method of claim 19, wherein the pore former comprises particles having a median size in a range of about 3 micrometers to about 10 micrometers.

32. The method of claim 19, wherein the pore former comprises particles having a median size in a range of about 3.5 micrometers to about 8 micrometers.

33. A method for forming a ceramic matrix composite article, the method comprising:
curing a shaped preform comprising a prepreg tape layup of unidirectional arrays of fiber tows, a matrix precursor for forming a ceramic matrix, and a pore former to pyrolyze the matrix precursor and burnout the pore former so that the shaped preform comprises the unidirectional arrays of fiber tows and a porous ceramic matrix skeleton having a monomodal pore size distribution with a median pore size of between about 1 micrometers and about 30 micrometers; and
subjecting the cured shaped preform to a partial chemical vapor infiltration and a melt infiltration, or a partial chemical vapor infiltration, a slurry casting, and a melt infiltration, to densify the porous ceramic matrix skeleton so that the ceramic matrix composite article has a fiber volume fraction between about 15 percent and about 35 percent.

* * * * *